(12) United States Patent
Jardine et al.

(10) Patent No.: US 7,232,483 B2
(45) Date of Patent: Jun. 19, 2007

(54) CEMENT COMPOSITION HAVING CHROMIUM REDUCER

(75) Inventors: Leslie A. Jardine, Salem, MA (US); Charles R. Cornman, Maynard, MA (US); Vijay Gupta, Woburn, MA (US); Byong-Wa Chun, Newton Upper Falls, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 11/388,435

(22) Filed: Mar. 24, 2006

(65) Prior Publication Data

US 2006/0169177 A1    Aug. 3, 2006

Related U.S. Application Data

(62) Division of application No. 11/048,600, filed on Feb. 1, 2005, now Pat. No. 7,087,110.

(51) Int. Cl.
*C04B 22/12* (2006.01)
(52) U.S. Cl. ............... 106/819; 106/713; 106/724; 106/726; 106/727; 106/823
(58) Field of Classification Search ............ 106/713, 106/724, 726, 727, 819, 823
See application file for complete search history.

(56) References Cited

U.S. PATENT DOCUMENTS

| | | | | |
|---|---|---|---|---|
| 1,750,371 | A | * | 3/1930 | Tanner ................ 431/4 |
| 1,968,152 | A | * | 7/1934 | Kirchner .............. 106/733 |
| 2,583,985 | A | * | 1/1952 | Avery .................. 106/733 |
| 2,759,891 | A | | 8/1956 | Rohrback et al. ...... 507/206 |
| 3,720,528 | A | * | 3/1973 | Jordan |
| 3,720,529 | A | * | 3/1973 | Jordan |
| 4,011,092 | A | | 3/1977 | Yue .................... 106/705 |
| 4,367,213 | A | | 1/1983 | Fiorucci et al. ........ 423/607 |
| 4,368,107 | A | | 1/1983 | Maejima et al. ........ 205/150 |
| 4,524,015 | A | | 6/1985 | Takahashi et al. ..... 252/188.28 |
| 4,572,739 | A | | 2/1986 | Rasmussen ........... 106/733 |
| 4,647,477 | A | | 3/1987 | DeLuca ................ 216/13 |
| 4,778,528 | A | | 10/1988 | Defosse ............... 106/803 |
| 4,784,691 | A | | 11/1988 | Rasmussen ........... 106/638 |
| 4,952,289 | A | | 8/1990 | Ciccone et al. ........ 205/633 |
| 4,959,135 | A | | 9/1990 | Zenner et al. ......... 205/633 |
| 5,075,362 | A | | 12/1991 | Hofeldt et al. ........ 524/72 |
| 5,211,853 | A | | 5/1993 | Jackson et al. ........ 210/713 |
| 5,211,875 | A | | 5/1993 | Speer et al. .......... 252/188.28 |
| 5,256,311 | A | | 10/1993 | Rossi et al. .......... 210/750 |
| 5,603,758 | A | * | 2/1997 | Schreifels, Jr. et al. .. 106/677 |
| 5,951,457 | A | | 9/1999 | James ................. 588/256 |
| 6,200,529 | B1 | | 3/2001 | Riggs, Jr. ............. 422/14 |
| 6,221,002 | B1 | | 4/2001 | James ................. 588/256 |
| 6,465,065 | B1 | | 10/2002 | Teumac et al. ........ 428/35.7 |
| 6,619,399 | B1 | * | 9/2003 | Chatterji et al. ...... 166/293 |
| 6,649,071 | B2 | | 11/2003 | Stapp ................. 210/757 |
| 6,709,508 | B2 | * | 3/2004 | Dietrich et al. ....... 106/724 |
| 2004/0177963 | A1 | * | 9/2004 | Chatterji et al. ...... 166/293 |

FOREIGN PATENT DOCUMENTS

| | | |
|---|---|---|
| DE | 10257879 | 2/2004 |
| EP | 0960865 | 12/1999 |
| EP | 0976695 | 2/2000 |
| EP | 0976696 | 2/2000 |
| EP | 1505045 | 2/2005 |
| JP | 6-100343 | 4/1994 |
| JP | 11267602 | 5/1999 |
| JP | 2003306707 | 10/2003 |
| WO | WO02/059049 | 8/2002 |

OTHER PUBLICATIONS

STN CHEM Abstracts abstract—AT 392778 (Perlmooser zementwerke) Jun. 1991, "Dry Mortar Compositions for coating vertical, horizontal, or inclined surfaces of steel reinforced concrete".—one page abstract only.*
Hannawayya, "Inorganic Admixture Inhibits Corrosion of Steel Embedded in Mortar", *F. Hannawayya's Laboratory for Chemical Research and Development*, before Feb. 4, 2004.
Hill, et al., "Heat evolution in composite cements with additions of Sn(II) and Sn(IV) chlorides", *Adv Cem Res*, 15(2), 57-66, 2003. (Abstract only).
Hill, et al., "The hydration roducts of Portland cement in the presence of tin(II) chloride", *Cement and Concrete Research*, 33 (2003) 121-124.
Liu, et al., "Influence of chemical additives on the hydration characteristics of western larch wood-cement-water mixtures", *Forest Products Journal* (1985), 35(7-8), 37-43. (Chinese article, abstract only).
Sagoe-Crentsil, "Corrosion Inhibitors for Mild Stee; Stannous Tin (SnII) in Ordinary Portland Cement", *Cement and Concrete Research*, vol. 24, No. 2, pp. 313-318, 1994.
Strizhev, et al., "Electron transfer in the elementary event of cement hydration", *Tsement* (1985), (10), 9-11. (Russian article, abstract only).
Svatovskaya, et al., "Effect of oxidation state of additives on the hardening of cement", *Tsement* (1980), (10), 8-9. (Russian article, abstract only).

* cited by examiner

*Primary Examiner*—Paul Marcantoni
(74) *Attorney, Agent, or Firm*—Craig K. Leon; Stephan P. Williams

(57) ABSTRACT

Exemplary compositions and methods for reducing hexavalent chromium in cementitious compositions involve the use of a liquid additive composition, comprising stannous chloride. Along with the stannous chloride may be used at least one co-additive comprising an antioxidant, oxygen scavenger, or mixture thereof, and/or at least one agent comprising a cement grinding aid, cement quality improver, or mixture thereof.

14 Claims, No Drawings

CEMENT COMPOSITION HAVING CHROMIUM REDUCER

This application is a divisional of Ser. No. 11/048,600 filed Feb. 1, 2005 now U.S. Pat. No. 7,087,110.

FIELD OF THE INVENTION

This invention relates to compositions and methods for reducing hexavalent chromium in cement compositions, and particularly to the use of a liquid additive composition for manufacture of Portland cement from grinding clinker, said liquid additive composition comprising stannous chloride, and, optionally a co-additive comprising an antioxidant, oxygen scavenger, or mixture thereof, and/or optionally an agent comprising a cement grinding aid, cement quality improver, or mixture thereof.

BACKGROUND OF THE INVENTION

Chromium is an unavoidable trace element of the raw material used in the manufacture of cement clinker. The oxidizing and alkaline burning conditions of the cement kiln forms toxic hexavalent chromium (CrVI). Hexavalent chromium is a powerful dermal irritant considered to be extremely toxic due to its high oxidation potential and ability to penetrate human tissue. It can cause skin sensitization, allergic reactions, and eczema. Chromium VI has high solubility in water and is released when cement is mixed with water. Thus, wet cement poses a health issue for workers who come into contact with wet cement or concrete.

Currently, the typical approach is to employ ferrous (Iron II) sulfate to reduce hexavalent chromium (CrVI) to trivalent chromium (CrIII), which tends to precipitate from solution, thereby posing a much reduced risk as a dermal irritant. However, the use of ferrous sulfate is not efficient because the dosage amount required for reducing CrVI to CrIII is at least ten times the stoichiometric amount of ferrous sulfate otherwise required. The poor dosage efficiency is explained partly by the fact that ferrous sulfate readily oxidizes from Iron (II) to Iron (III) during prolonged contact with air and water. This poor storage stability decreases the efficiency of ferrous sulfate, and can render it useless as a chromate reducer if not used quickly.

The fact that dry Iron (II) salts can be oxidized to Iron (III) with prolonged contact in water precludes it from being dispensed in a water solution.

Moreover, dry Iron (II) can not be added to cement over 80° C., without risking considerable oxidation. Since cement exits the mill at temperatures up to 130° C., and goes to storage at temperatures in excess of 80° C., the cement plant is limited to using excessively high doses of iron (II) sulfate very late in their manufacturing and distribution process. It is often added just prior to packaging in bags. This necessitates additional quality control monitoring steps to assure CrVI minimum level compliance. This is both inconvenient and costly for the cement plant operator. In addition to the extra cost and inconvenience, an excessive level of iron sulfate can be detrimental to cementitious systems due to increased water demand and extended set time.

As an alternative to iron (II) sulfate, stannous (tin 2+) salts can be employed as chromium reducers. The required dosages of solid stannous salts (~0.02% $Sn^{2+}$ ion based on the weight of cement) are much lower than that of iron II sulfate. The present inventors believe that stannous salts are easier to use and would be more heat resistant and storage stable when combined with cement in the milling process.

Although stannous sulfate is water soluble, it quickly loses dosage efficiency when added as an aqueous solution to cement. The actual amount of stannous sulfate needed in solution is at least double the amount that is required when stannous sulfate is added as a powder. Such a disparity has precluded the use of stannous sulfate in solution form.

In view of the foregoing prior art disadvantages, there exists a need for a novel chromium reducer, which can be added as a low dosage liquid material, and which is storage and heat stable.

SUMMARY OF THE INVENTION

In surmounting the disadvantages of the prior art, the present invention provides novel methods and compositions useful for reducing hexavalent chromium (CrVI) in cementitious compositions using stannous chloride in a liquid additive form, such as solubilized, dispersed, and/or suspended in water, a glycol or glycerol, or a mixture thereof.

The present inventors realized that stannous chloride has a higher $Sn^{II}$ content (62.6%) than stannous sulfate (55.2%), and that this permits stannous chloride to be used at a lower dosage rate than stannous sulfate. In addition, stannous chloride (>60% soluble) is more soluble than stannous sulfate, requiring a relatively lower liquid dosage than would be the case if one were to use a liquid form of stannous sulfate. Furthermore, stannous sulfate, when used as a liquid, has a lower chromium-reducing efficiency than its solid form, which is now in use. Accordingly, the use of a liquid additive composition containing stannous chloride as chromium reducer is both advantageous and inventive, especially when considered against the present industry use of stannous sulfate for chromium reduction.

An exemplary method of the invention thus comprises introducing to cement, such as by adding to cement clinker before or during the intergrinding thereof to produce Portland cement (e.g., in a ball or roller mill cement grinding plant), a CrVI reducing agent in the form of stannous chloride ($SnCl_2$) dissolved, dispersed and/or suspended in a aqueous or non-aqueous liquid. The amount of stannous chloride may be 20 to 95 percent, more preferably 35 to 85%, and most preferably 45 to 75% based on total weight of the liquid additive composition.

Other exemplary methods and liquid additive compositions preferably further comprise the use of a co-additive comprising an antioxidant, oxygen scavenger, or mixture thereof, optionally with an agent comprising a cement grinding aid, cement quality improver, or mixture thereof.

Cement producers would need only one storage tank and one (liquid) additive delivery system per grinding mill, thus saving on capital and quality control costs, while manufacturing cement with consistent characteristics.

Cement compositions made by the above methods, as well as additive compositions for use in the intergrinding of cement clinker or for incorporation with the finished cement, are also described.

Other advantages and features of the invention are discussed in further detail herein.

DETAILED DESCRIPTION OF EXEMPLARY EMBODIMENTS

Portland cement clinker is prepared by sintering a mixture of components including calcium carbonate (as limestone), aluminum silicate (as clay or shale), silicon dioxide (as sand) and miscellaneous iron oxides. During the sintering process, chemical reactions take place in which hardened nodules, commonly called "clinkers," are formed. After the clinker has cooled, it is pulverized together with a small amount of gypsum (calcium sulfate) in a finish grinding mill to provide a fine, homogeneous powdery product known as Portland cement.

Thus, an exemplary method of the invention comprises introducing to cement, such as by adding to cement clinker before or during the intergrinding thereof to produce cement, a CrVI reducing agent in the form of stannous chloride in an amount of 0.001 to 5.0 percent based on weight of cement clinker being ground; more preferably in an amount of 0.002 to 1.0 percent, and most preferably in an amount of 0.005 to 0.04 percent based on weight of cement clinker being ground.

Cementitious compositions prepared by processes of the invention thus comprise primarily cement made from cement clinker. Accordingly, such compositions preferably have at least 40% by weight of Portland cement, and more preferably at least 80% by weight. Secondary argillaceous or pozzolanic materials may also be mixed with the cement clinker, such as clay, natural pozzolan, flyash, limestone, granulated blast furnace slag, or a mixture thereof, to provide a hydratable cementitious composition.

It is believed that the cement processing aid compositions of the present invention, and processes employing such compositions, are suitable for use in conventional clement grinding mills, including, without limitation, ball mills, and mills having rollers. For example, grinding processes involving two or more opposed rollers, as well as rollers used on circular tables, are contemplated herein. Preferably, the intergrinding occurs at a temperature in the range of 80° C.–140° C.

An exemplary method of the invention for reducing hexavalent chromium in cementitious compositions, comprises: grinding cement clinker to produce Portland cement; introducing to the cement clinker, before or during the intergrinding thereof, a liquid additive composition comprising stannous chloride present in an amount of 20–95%, more preferably 35–85%, and most preferably 45–75%, based on the total weight of the liquid additive.

Other exemplary methods of the invention, in addition to the stannous chloride, comprise introducing a co-additive comprising an antioxidant, oxygen scavenger, or mixtures thereof, as a co-additive to the cement clinker, before or during said grinding, in a stannous chloride:co-additive ratio, of 99.5:0.5 to 20:80; more preferably in a ratio of 99:1 to 50:50; and most preferably in a ratio of 95:5 to 60:40.

Preferably, although not necessarily, the stannous chloride and co-additive (antioxidant and/or oxygen scavenger) are both dispensed in the same liquid additive composition. Less preferably, the co-additive can be added separately, such as before, during, or after the grinding of the clinker cement.

Thus, the amount of total co-additive (antioxidant and/or oxygen scavenger), used in (preferably) or separately with the liquid additive composition, should be 0.05 to 80.0%, more preferably 0.5 to 50.0, and most preferably 1.0 to 30.0%, based on total weight of the liquid additive composition.

As used herein, the term "antioxidant" means and refers to compositions, materials, or compounds which, especially when incorporated into the liquid additive composition containing the stannous chloride chromium(VI)-reducing agent, decreases the rate of oxidation or otherwise reduces the undesirable effects of oxidation upon the stannous chloride. For example, U.S. Pat. No. 5,211,875 disclosed antioxidants believed to be suitable for the present invention, such as 2,6-di(t-butyl)-4-methylphenol(BHT), 2,2'-methylene-bis(6-t-butyl-p-cresol), triphenylphosphite, tris-(nonylphenyl)phosphite and dilaurylthiodipropionate. It is also believed that other antioxidants, such as sulfur dioxide, trihydroxy butyrophenone, and butylated hydroxy anisole, as taught in U.S. Pat. No. 6,465,065 would also be suitable for use in the present invention. As mentioned above, such antioxidants can be incorporated with the stannous chloride in the same liquid additive composition, or, less preferably, added separately into the cement or cement clinker before, during, or after grinding. Amounts of antioxidants used should preferably be in the range of 0.05 to 80%, more preferably in the amount of 0.5 to 50%, and most preferably 1.0 to 30.0%, based on total weight of the liquid additive composition (if incorporated into the composition). If added separately from the liquid additive, the amount of antioxidant may be 0.1 ppm to 1000 ppm, more preferably 1.0–300 ppm, and most preferably 5–100 ppm (parts per million based on dry cement weight).

As used herein, the term "oxygen scavenger" means and refers to compositions, materials or compounds which, when included in the liquid additive composition comprising the stannous chloride CrVI reducing agent, can remove oxygen, such as (a) by reacting or combining with entrapped oxygen, or (b) by catalyzing an oxidation reaction yielding innocuous products.

Exemplary oxygen scavengers useful as co-additives in the present invention include, but are not limited to, (a) a compound containing an ethylenically unsaturated hydrocarbon (b) a phenolic or salt or derivative thereof; (d) a hydroxylamine or hydrazine or derivative thereof; (e) a sulfurous acid or salt or derivative thereof; (f) a transition metal complex; or mixtures thereof.

One class of exemplary oxygen scavenging compositions is composed of ethylenically unsaturated hydrocarbons. The ethylenically unsaturated hydrocarbon may be used by themselves or with a transition metal catalyst. The ethylenically unsaturated hydrocarbon may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule.

Preferred examples of unsubstituted ethylenically unsaturated hydrocarbons include, but are not limited to, diene polymers such as polyisoprene, (e.g., transpolyisoprene), polybutadiene (especially 1,2-polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as beta-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. The composition used may also comprise a mixture of two or more of the substituted or unsubstituted ethylenically unsaturated hydrocarbons described above.

As mentioned above, the ethylenically unsaturated hydrocarbons may be used, in many cases, advantageously with a transition metal catalyst. While not being bound by any particular theory, suitable metal catalysts are those that can readily interconvert between at least two oxidation states. See Sheldon, R. A.; Kochi, J. K.; "Metal-Catalyzed Oxidations of Organic Compounds" (Academic Press, New York 1981). Preferably, the transition metal catalyst is in the form of a salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal, when introduced into liquid additive or into the cement, is not necessarily that of the active form. The metal is preferably iron, nickel or copper, more preferably manganese, and most preferably cobalt. Suitable counterions for the metal include, but are not limited to, chloride, acetate, stearate, palmitate, 2-ethylhexanoate, neodecanoate or naphthenate.

A preferred class of substituted ethylenically unsaturated co-additives includes enediols. Commercial examples of enediols include ascorbic acid and erythorbic acid and their salts (e.g., sodium ascorbate, sodium erythorbate) or derivatives. Any stereoisomer of these compounds can be effective in the current invention. Alkali and alkaline earth metal salts, such as potassium or sodium ascorbic acid/ ascorbate, are preferred.

Further exemplary embodiments, wherein enediols are used, comprise activators for enhancing the oxygen scavenging ability of enediols. For example, U.S. Pat. No. 4,524,015 discloses the use of a granular mixture of an ascorbate or ascorbic acid, an alkali metal carbonate, an iron compound, carbon black, and water. Accordingly, these are believed to be useful enediol activators.

Further exemplary methods and compositions of the invention may include activating agents for the enediol-containing compounds, such as a transition metal compound, complex or chelate. More preferred are transition metals chosen from the group comprising iron, copper, cobalt, or nickel. Most preferred is iron or copper. The transition metal may preferably be supplied either (1) as a compound such as an ordinary salt, or (2) as a polyalkylpolyamine ("PAPA") chelate, macrocyclic amine ("macrocycle") chelate, or an amino polycarboxylate chelate of a transition metal ion. It is also possible to utilize other transition metal chelates which contain one or more amine, hydroxyl, carboxylate or sulfhydryl groups, or combinations thereof.

Metal catalysts may include simple transition metal salts such as ferrous or ferric chloride, cuprous or cupric chloride, ferrous or cupric sulfate, ferrous gluconate, nickel sulfate, or cobalt chloride, which is more preferable, and cupric sulfate, which is most preferred. The chelated-transition metal amines are particularly useful as metal catalysts used with ascorbates because, when utilized in the appropriate amounts, they possess oxygen scavenging properties that augment the oxygen scavenging properties of ascorbates, thus making the metal chelate a secondary scavenging compound. Also, the transition metal ion in the complex can catalyze the oxygen scavenging activity of ascorbates. Of the chelated ion complexes, the polyalkylpolyamines are preferable; more preferable are those which have symmetrical-length carbon chains between adjacent nitrogen atoms, and most preferable are those wherein each such chain comprises between one and four, and optimally two, carbon atoms. Transition metal chelates of ethylene diamine tetracetic acid ("EDTA") can also be used, such as $Fe^{++}/EDTA/(2Na^+)$.

Further exemplary oxygen scavengers thus may include transition metal complexes by themselves (e.g., apart from use with enediols as discussed above). Such materials have been developed by Aquanautics, Inc., Alameda, Calif. (See Packaging Technology, "Oxygen Eliminator Extends Shelf Life," 1989 and "Extending the Life of a Bottle of Beer," New York Times, Mar. 29, 1989). These materials are particularly (but not exclusively) those complexes formed between transition metals and so-called polyalkylamines as described in U.S. Pat. No. 4,959,135 which is incorporated herein by reference, as well as those complexes formed between transition metals and "macrocyclic amines" as described in U.S. Pat. No. 4,952,289, which is also incorporated herein by reference.

These transition metal complexes can bind oxygen and be used as oxygen scavengers in the present invention. Such complexes either do not form or do not become activated (i.e., cannot, or do not, bind oxygen) until the amine and metal are together exposed to water or water vapor.

Without being wished to be bound by theory, the inventors believe that the co-additives (antioxidant and/or oxygen scavenger) may work beneficially by way of one or more of the following mechanisms. First, the co-additive can act as a classic antioxidant/oxygen scavenger whereby any oxidizing agent (molecular oxygen or otherwise) that enters a liquid carrier medium containing the CrVI reducing agent, reacts preferentially with the co-additive, thereby sparing the stannous chloride CrVI reducing agent. This effectively provides for a longer shelf-life for the stannous chloride agent before it is added to the cement grinding mill or to the ground cement.

The inventors also believe that this same mechanism is at work after the stannous chloride CrVI reducing liquid composition has been added to the cement. As adventitious moisture and molecular oxygen permeate the treated cement, the oxygen will be scavenged by the co-additive before it reacts with the metal-based CrVI reducing agent. To this end, it is preferred that the stannous chloride and co-additive (antioxidant and/or oxygen scavenger) are premixed into a single liquid additive.

The inventors also believe that co-additives containing an antioxidant and/or oxygen scavenger can react to regenerate any of the stannous tin that has decomposed, through inadvertent reaction with adventitious molecular oxygen (or other unwanted oxidizing agents), thereby maintaining the level of the stannous tin reducing agent. This mechanism may operate before the liquid additive composition is added to cement, during storage of the finished cement, or when the finished cement is used for making mortar or concrete.

The inventors further believe that the co-additive containing an antioxidant and/or oxygen scavenger may form an adduct with the stannous chloride CrVI reducing agent or with an oxidized form thereof, e.g., tin (IV), which is itself an active CrVI reducing agent.

A further embodiment involves combining stannous chloride and the above-described co-additive (antioxidant and/or oxygen scavenger) with one or more agents that are beneficial to the manufacture of cement. Such agents include cement grinding aids such as glycols, glycerols, amines, alkanolamines, and known cement quality improvers such as sodium chloride, calcium nitrate, calcium nitrite, sugars, and others. Glycols and glycerols are believed to improve the storage stability of stannous salts. The mechanism for this benefit is unknown, but this could involve a decrease in the activity of molecular oxygen in the presence of glycols or glycerols.

Other exemplary co-additives comprise phenolics which can serve as oxygen scavengers, such as a quinone and hydroxyl forms thereof, including but not limited to hydroquinone (p-dihydroxybenzene), pyrocatechol (o-dihydroxybenzene), and derivatives thereof.

Still further exemplary oxygen scavenging co-additives comprise hydroxylamine, hydrazine, or a salt or derivative thereof. An exemplary hydroxylamine has a structure represented by the formula

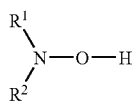

wherein $R^1$ and $R^2$ each comprise a hydrogen or $C_1$–$C_{18}$ alkyl, alkene, or aryl group. An exemplary hydrazine has a structure represented by the formula

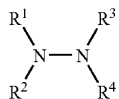

wherein $R^1$, $R^2$, $R^3$, and $R^4$ each comprise a hydrogen or $C_1$–$C_{18}$ alkyl, alkene, or aryl group. Exemplary hydroxylamine salts include hydroxylamine hydrochloride ($NH_2OH.HCl$) and hydroxylamine sulfate (($NH_2OH$)$_2$.$H_2SO_4$); while exemplary hydrazine salts include hydrazine hydrochloride ($N_2H_4.HCl$ or $N_2H_4.2HCl$) and hydrazine sulfate ($N_2H_4.H_2SO_4$).

An exemplary hydroxyalkylhydroxylamine has the formula HO—N—$CH_2$—[CH(OH)—R]$_2$ wherein R is selected from the group consisting of H and $C_1$ to $C_{10}$ alkyl; wherein the initial rate of reaction between said hydroxyalkylhydroxylamine and dissolved oxygen is more than about 1.5 times the initial rate of reaction between dissolved oxygen and the corresponding non-hydroxylated alkylhydroxylamine. Another hydroxyalkylhydroxylamine is selected from the group consisting of N,N,-bis (2-hydroxyethyl) hydroxylamine, N,N-bis(2-hydroxypropyl) hydroxylamine, and N,N-bis(2-hydroxybutyl) hydroxylamine.

Further exemplary oxygen scavenger co-additives comprise a sulfurous acid or a salt thereof, such as a sulfite, bisulfite, or thiosulfite. Thus, for example, an alkali metal salt can be incorporated into the liquid additive composition, alongside the stannous chloride, in the form of a alkali metal salt such as sodium sulfite or bisulfite, or potassium sulfite or bisulfite.

In other exemplary embodiments of the invention, a sulfite may be used in combination with other co-additives. For example, U.S. Pat. No. 4,384,972 discloses the use of a salt of a metal, an alkali substance, a sulfite or other deliquescent compound, and, optionally, ascorbic acid or a salt thereof.

More preferably, exemplary methods and liquid additive compositions of the present invention comprise the use of stannous chloride and two or more co-additives comprising an antioxidant, oxygen scavenger, or mixture thereof. Accordingly, a preferred method of the invention comprises introducing at least two antioxidants and/or oxygen scavengers to cement clinker during the intergrinding thereof. For example, an ascorbic acid and sulfite may be used in combination (or their salts and derivatives). As another example, a phenolic and hydroxylamine (or their salts and derivative) can be used in combination. Preferably, these combinations are added along with the stannous chloride in the same liquid additive composition, but it is believed that they could also be added to the cement before, during, or after the cement clinker grinding operation.

Still further exemplary embodiments can employ, with or without any of the above-mentioned co-additives, a cement additive agent comprising a cement grinding aid, cement quality improver, or mixture thereof. Such an agent may be selected from the group consisting of an amine, alkanolamine, acrylic acid or salt thereof, glycol, glycerol, acetate salt, a phenol, chloride salt, sugar, dispersants, lignins, air entraining surfactants, nitrite salts, and nitrate salts, said grinding additive being different from said oxygen scavenging co-additive. Triethanolamine, diethylisopropanolamine, triisopropanolamine, or mixture thereof are other examples of such agents. The agent may be incorporated into the liquid additive composition, or used separately in the clinker grinding process, in the amount of 0.05 to 80%, more preferably in the amount of 0.5 to 50%, and most preferably in the amount of 1.0 to 30.0%, based on total weight of the liquid additive composition having the stannous chloride dissolved, dispersed, and/or suspended therein.

The stannous chloride may be dispersed or suspended, for example, in glycol, glycerol, or an alkanolamine, which are also believed to be able to carry antioxidants and/or oxygen scavengers if these are employed in the liquid additive composition. Exemplary glycols and glycerols include diethylene glycol, ethylene glycol, butylenes glycol, propylene glycol, sorbitol, or mixtures thereof.

The present invention also pertains to Portland cement made from the above-described methods. Such cement compositions may also optionally contain flyash, granulated blast furnace slag, or other components conventionally associated with or used in combination with Portland cement.

The present invention also provides liquid compositions comprising: stannous chloride; at least one co-additive comprising an antioxidant, oxygen scavenger, or mixture thereof; and, optionally, at least one agent comprising a cement grinding aid, cement quality improver, or mixture thereof. These components are solubilized, dispersed, and/or suspended in a liquid carrier (e.g., water, glycol, glycerol, or mixture thereof). The above-mentioned agent may be selected from the group consisting of an amine, alkanolamine, acrylic acid or salt thereof, glycol, glycerol, acetate salt, a phenol, chloride salt, sugar, dispersants, lignins, air entraining surfactants, nitrite salts, and nitrate salts, said agent being different from said co-additive.

EXAMPLE I

Tin sulfate and tin chloride, in both solid and liquid (e.g., aqueous solution) forms, were tested by intergrinding with them with Portland cement in a laboratory ball mill, and then pore water is obtained from the cement sample thus made to ascertain chromium levels.

The proportions of materials in the laboratory prepared cement are as follows: 95.3% clinker, 2.8% gypsum, and 1.9% plaster. The grinds were prepared at ambient temperature. The tin sulfate and tin chloride were added in the various dosages shown in Table I below. The dosage for the active stannous tin portion is also given in Table I.

Soluble ppm chromium (measured as chromate) is given for the cold grind as prepared, as well a portion of the grind that was heat treated at 180° C. for 2 hrs. The purpose of heat treating the grind is to determine the relative resistance of the chromium ("Cr") reducing agent to ambient oxidation, and, hence, its effectiveness after cement storage.

TABLE I

| Chromate reducing Additive | Additive (Ppm) | $Sn^{2+}$ (ppm) | Cold Grind ppm Cr | Heat Treated Ppm Cr |
|---|---|---|---|---|
| None | — | — | 8 | 9 |
| Stannous sulfate powder | 50 | 28 | 1 | 1 |
| Stannous sulfate powder | 100 | 55 | 2 | 3 |
| Stannous sulfate powder | 200 | 111 | <0.5 | <0.5 |
| 20% stannous sulfate solution | 1000 | 111 | 5 | 8 |
| 20% stannous sulfate solution | 2000 | 221 | <0.5 | 4 |
| 20% stannous sulfate solution | 3000 | 332 | <0.5 | <0.5 |
| Stannous chloride powder | 42 | 26 | 5 | 7 |
| Stannous chloride powder | 171 | 107 | <0.5 | <0.5 |
| 62% stannous chloride solution | 69 | 22 | 5 | 8 |
| 62% stannous chloride solution | 285 | 93 | <0.5 | 5 |
| 62% stannous chloride solution | 571 | 186 | <0.5 | <0.5 |

With stannous sulfate solution, greater than 111 parts per million (ppm), but less than 221 ppm, of stannous tin is required to bring chromium ("Cr") below detectable limits in the unheated grind samples.

With stannous chloride solution, greater than 22 ppm but less than 93 ppm of stannous tin is required to bring the chromium below detectable limits in the unheated grind samples.

In the heated grinds with stannous sulfate solution, greater than 211 ppm, but less than 332 ppm, of stannous tin is required to bring the chromium below detectable limits With stannous chloride solution, greater than 93 ppm but less than 186 ppm of stannous tin is required to bring the chromium below detectable limits in the heated grind samples.

Use of stannous chloride solution over stannous sulfate solution offers both lower dosage, and greater efficiency of the stannous tin for chromium reduction.

The amount of chromium, in terms of parts per million (PPM), is determined by UV measurement of the cement pore water. Soluble chromate can be identified by UV peaks at 277 nm and 375 nm. Calibration is made with a potassium dichromate solution. Cement pore water was obtained by creating a cement paste with a cement to water ratio of 1:1. After 15 minutes of mixing, the cement paste is allowed to sit until it is aged for a total of 30 minutes. The paste is centrifuged, and the supernatant is decanted and filtered to obtain the pore water (below detection limits is indicated as "<0.5 ppm").

EXAMPLE II

For comparison, a similar test was done on a different cement interblended (post-grinding) with iron II sulfate. Dosages of 1000–3000 ppm of $FeSO_4 \cdot 7H_2O$ lose effectiveness after heating. A dosage of 5000 ppm is required for sustained effectiveness. Dosages of 3000–5000 ppm are typically used to maintain effectiveness after storage. Data is shown in Table II.

TABLE II

| UK Type I OPC Added Iron II Sulfate heptahydrate ppm | No heating Measured Cr (VI) ppm | 180 C. for 2 hrs measured Cr (VI) ppm |
|---|---|---|
| 0 | 9.8 | 10.2 |
| 1000 | 0.5 | 9.6 |
| 3000 | 0.0 | 3.4 |
| 5000 | 0 | 1.0 |

EXAMPLE III (Co-additives)

Efficiency of stannous tin for chromium reduction can be further enhanced by addition of a co-additive to the tin chloride solution. Examples of such co-additives are other reducing agents, such as L-ascorbic acid, which is ineffective in the reduction of chromium in cementitious systems by itself.

Table III shows a performance comparison of a first solution comprising tin chloride (62%) and water (38%), and a second solution comprising tin chloride (58%), ascorbate (6.1%), and water (35.9%).

[Table Begins on Next Page]

TABLE III

| Chromate reducing Additive | Additive (Ppm) | $Sn^{2+}$ (ppm) | Cold Grind ppm Cr | Heat Treated Ppm Cr |
|---|---|---|---|---|
| None | — | — | 8 | 9 |
| Stannous chloride powder | 42 | 26 | 5 | 7 |
| Stannous chloride powder | 171 | 107 | <0.5 | <0.5 |
| 62% stannous chloride solution | 69 | 22 | 5 | 8 |
| 62% stannous chloride solution | 285 | 93 | <0.5 | 5 |
| 62% stannous chloride solution | 571 | 186 | <0.5 | <0.5 |
| Tin chloride/Ascorbic acid solution | 85 | 26 | 5 | 7 |
| Tin chloride/Ascorbic acid solution | 171 | 52 | 2 | 5 |
| Tin chloride/Ascorbic acid solution | 285 | 87 | <0.5 | <0.5 |

Both additives were interground into a Portland cement prepared in a laboratory ball mill. The proportions of materials in the cement prepared in the laboratory are as follows: 95.3% clinker, 2.8% gypsum, and 1.9% plaster. The grinds were prepared at ambient temperature.

Soluble ppm Cr (measured as chromate) is given for the cold grind as prepared, as well as a portion of the grind that was heat treated at 180° C. for 2 hours. The purpose of heat treating the grind is to determine the relative resistance of the chromium reducing agent to ambient oxidation, and, hence, its effectiveness after cement storage.

In the heated grinds with stannous chloride solution, stannous tin in an amount greater than 93 ppm but less than 186 ppm was required to bring chromium below detectable limits. With the stannous chloride/ascorbic acid solution, less than 87 ppm of stannous tin was required to bring chromium below detectable limit in the heated grinds. Even with the amount of ascorbic acid utilized, the tin chloride/ascorbic acid solution is both more dosage efficient, and more economical than the 62% tin chloride solution.

The amount of chromium, in parts per million (PPM), is determined by UV measurement of the cement pore water.

Soluble chromate can be identified by UV peaks at 277 nm and 375 nm. Calibration is made with a potassium dichromate solution. Cement pore water was obtained by creating a cement paste with a cement to water ratio of 1:1. After 15 minutes of mixing, the cement paste is allowed to sit until it is aged for a total of 30 minutes. The paste is centrifuged, and the supernatant is decanted and filtered to obtain the pore water. The amount of chromium which was below detection limits is designated by "<0.5." under the column designating units in parts per million (ppm).

The foregoing illustrations and examples are provided for illustrative purposes only and not intended to limit the scope of the invention.

We claim:

1. A cement composition comprising:
   a fine, homogeneous powdery Portland cement ground from cement clinker, said Portland cement comprising at least 40% by weight of said cement composition;
   said powdery Portland cement product further comprising stannous chloride that has been interground with said cement clinker in an amount of 0.005 to 5.0 percent based on weight of said Portland cement; and
   said powdery Portland cement further comprising at least one co-additive in a stannous chloride:co-additive ratio of not less than 99.5:0.5 and not greater than 20:80, said at least one co-additive comprising an enediol, its salt, or derivative thereof.

2. The cement composition of claim 1 further comprising an agent selected from the group consisting of an amine, alkanolamine, acrylic acid or salt thereof, glycol, glycerol, acetate salt, a phenol, chloride salt, sugar, dispersants, lignins, air entraining surfactants, nitrite salts, and nitrate salts, said agent being different from said co-additive.

3. The cement composition of claim 1 wherein said enediol, its salt, or derivative thereof is selected from the group consisting of ascorbic acid, erythorbic acid, and their salts.

4. The cement composition of claim 3 wherein said powdery Portland cement comprises an ascorbic acid or its salt.

5. The cement composition of claim 3 wherein said enediol, its salt, or derivative thereof is combined with an activator selected from the group consisting of a transition metal compound, transition metal complex, and transition metal chelate.

6. The cement composition of claim 1 further comprising a cement grinding aid.

7. The cement composition of claim 1 wherein said Portland cement is present in an amount of at least 80% by weight of said cement composition.

8. The cement composition of claim 1 wherein said powdery Portland cement further comprises a material selected from the group consisting of clay, pozzolan, fly ash, limestone, granulated blast furnace slag, and mixture thereof.

9. The cement composition of claim 5 wherein said activator comprises a transition metal compound, transition metal complex, or transition metal chelate selected from the group consisting of iron, copper, cobalt, and nickel.

10. The cement composition of claim 1 wherein said Portland cement is present in an amount of at least 80% by weight of said cement composition, said at least one enediol, its salt, or derivative comprises an ascorbic acid or its salt, an erythorbic acid or its salt; and said cement composition further comprises at least one activator comprising a transition metal compound, transition metal complex, or transition metal chelate selected from the group consisting of iron, copper, cobalt, and nickel.

11. The cement composition of claim 10 wherein said stannous chloride, ascorbic acid or its salt and/or erythorbic acid or its salt, and said at least one activator are incorporated into said ground Portland cement as a liquid additive composition.

12. A cement composition comprising:
    a fine, homogeneous powdery Portland cement ground from cement clinker, said Portland cement comprising at least 40% by weight of said cement composition;
    said powder Portland cement further comprising a material selected from the group consisting of clay, pozzolan, fly ash, limestone, granulated blast furnace slag, and mixture thereof;
    said powdery Portland cement comprising stannous chloride in an amount of 0.005 to 5.0 percent based on weight of said Portland cement, said stannous chloride operative to reduce hexavalent chromium in said ground Portland cement;
    said powdery Portland cement further comprising at least one co-additive in a stannous chloride:co-additive ratio of not less than 99.5:0.5 and not greater than 20:80, said at least one co-additive comprising an ascorbic acid or its salt, an erythorbic acid or its salt, or a derivative thereof;
    said powdery Portland cement further comprising at least one activator comprising a transition metal selected from the group consisting of iron, copper, cobalt, and nickel;
    said stannous chloride, said at least one co-additive, and said at least one activator being interground together, thereby preserving the ability of said stannous chloride to reduce hexavalent chromium in said ground powdery Portland cement.

13. The cement composition of claim 12 wherein said at least one-co-additive is an ascorbic acid or salt thereof.

14. The cement composition of claim 13 wherein said at least one-co-additive is sodium ascorbic acid or ascorbate.

* * * * *